(12) United States Patent
Xiao et al.

(10) Patent No.: US 10,446,926 B2
(45) Date of Patent: Oct. 15, 2019

(54) BASE STATION ANTENNA

(71) Applicant: Huawei Technologies Co., Ltd., Shenzhen (CN)

(72) Inventors: Weihong Xiao, Shenzhen (CN); Zhiqiang Liao, Shenzhen (CN); Wei Su, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 199 days.

(21) Appl. No.: 15/141,516

(22) Filed: Apr. 28, 2016

(65) Prior Publication Data

US 2016/0248156 A1 Aug. 25, 2016

Related U.S. Application Data

(63) Continuation of application No. PCT/CN2014/089673, filed on Oct. 28, 2014.

(30) Foreign Application Priority Data

Oct. 28, 2013 (CN) .................... 2013 2 0668707 U

(51) Int. Cl.
*H01Q 3/26* (2006.01)
*H01P 1/18* (2006.01)
(Continued)

(52) U.S. Cl.
CPC .............. *H01Q 3/26* (2013.01); *H01P 1/184* (2013.01); *H01P 1/2135* (2013.01); *H01P 5/16* (2013.01);
(Continued)

(58) Field of Classification Search
CPC ....................................................... H01P 1/184
(Continued)

(56) References Cited

U.S. PATENT DOCUMENTS 3,702,481 A * 11/1972 Koller ...................... H01Q 1/08
342/371
6,169,519 B1 * 1/2001 Holecek .............. G01S 13/9303
342/442
(Continued)

FOREIGN PATENT DOCUMENTS

CN 102740509 A 10/2012
CN 203521615 U 4/2014
(Continued)

*Primary Examiner* — Vladimir Magloire
*Assistant Examiner* — Helena H Seraydaryan
(74) *Attorney, Agent, or Firm* — Slater Matsil, LLP

(57) ABSTRACT

The present invention provides a base station antenna, including power dividers, network calibration modules, and connectors. The base station antenna further includes at least two phase shifters. At least one phase shifter is integrated with a combiner, the connectors are connected to the network calibration modules, and the network calibration modules are connected to the phase shifters. The one phase shifter integrated with the combiner is connected to the power divider, and at least one output port of the at least one other phase shifter is connected to the phase shifter integrated with the combiner. The base station antenna has an integrated design of phase shifters and combiners, which allows cables in different bands to be shared, reduces a quantity of used cables, is easy to implement in an actual layout and production, facilitates the layout and heat dissipation on the whole, satisfies user requirements, and reduces costs.

20 Claims, 5 Drawing Sheets

(51) Int. Cl.
  *H01Q 1/24* (2006.01)
  *H01P 5/16* (2006.01)
  *H04W 88/08* (2009.01)
  *H01P 1/213* (2006.01)
  *H01Q 21/30* (2006.01)
(52) U.S. Cl.
  CPC ............ *H01Q 1/246* (2013.01); *H01Q 21/30* (2013.01); *H04W 88/08* (2013.01)
(58) Field of Classification Search
  USPC ........................................................ 342/371
  See application file for complete search history.

(56) References Cited

U.S. PATENT DOCUMENTS

| | | | | |
|---|---|---|---|---|
| 6,664,921 | B2 * | 12/2003 | Pratt | G01S 19/21 342/357.63 |
| 8,786,493 | B2 | 7/2014 | Pu et al. | |
| 2003/0107517 | A1 * | 6/2003 | Ikeda | H04B 7/084 342/372 |
| 2004/0027279 | A1 * | 2/2004 | Jacomb-Hood | H01Q 25/00 342/368 |
| 2004/0063467 | A1 * | 4/2004 | Shapira | H04B 7/0491 455/561 |
| 2004/0085127 | A1 * | 5/2004 | Matsuyoshi | H03F 1/32 330/136 |
| 2005/0046514 | A1 | 3/2005 | Janoschka | |
| 2010/0315978 | A1 * | 12/2010 | Satapathy | H01Q 1/246 370/294 |
| 2012/0235872 | A1 * | 9/2012 | Lewis | H01P 1/184 343/753 |
| 2013/0229308 | A1 * | 9/2013 | Pu | H01Q 3/40 342/373 |
| 2015/0002361 | A1 | 1/2015 | Pu et al. | |
| 2016/0248156 | A1 | 8/2016 | Xiao et al. | |

FOREIGN PATENT DOCUMENTS

| | | | |
|---|---|---|---|
| WO | 2010106396 A1 | 9/2010 | |
| WO | WO 2012016941 A1 * | 2/2012 | ............ H01Q 1/246 |
| WO | 2012095056 A2 | 7/2012 | |
| WO | 2012103831 A2 | 8/2012 | |

* cited by examiner 131  121  132

122

121  122

BASE STATION ANTENNA

This application is a continuation of International Application No. PCT/CN2014/089673, filed on Oct. 28, 2014, which claims priority to Chinese Patent Application No. 201320668707.0, filed on Oct. 28, 2013, both of which are hereby incorporated by reference in their entireties.

TECHNICAL FIELD

The present invention relates to the field of communication device technologies, and in particular, to a base station antenna.

BACKGROUND

Currently, a base station antenna, such as a smart base station antenna, has a large number of phase shift polarizations and a large number of bands, and requires independent remote electrical tilt. In the prior art, a design of a phase shift network for feeding power to a radiating element is very complex. If a conventional method is used, as shown in FIG. 1, each phase shifter is connected to the radiating element by using cables, and phase shifters 2', combiners 5', and power dividers 1' are designed separately, where the power dividers 1' are connected to the combiners 5', the combiners 5' are connected to the phase shifters 2', the phase shifters 2' are connected to network calibration modules 3', and the network calibration modules 3' are connected to connectors 4'. In the prior art, a quantity of cables of the base station antenna exponentially increases with increase of a quantity of polarizations, and the quantity of cables is doubled again with separation of bands (that is, the radiating element of the antenna is shared). Therefore, a layout and heat dissipation of the whole antenna are very difficult and hardly satisfy user requirements. Because there are numerous cables, and costs are also very high, it is difficult to implement the antenna in an actual layout and production.

SUMMARY

An objective of the present invention is to overcome the foregoing disadvantages of the prior art, and provide a base station antenna, which may reduce a quantity of cables and reduce costs. The costs are also very high. The base station antenna is easy to implement in an actual layout and production.

According to an aspect, in a first implementation, the present invention provides a base station antenna, including power dividers, network calibration modules, and connectors, where the base station antenna further includes at least two phase shifters, where at least one phase shifter is integrated with a combiner, the connectors are connected to the network calibration modules, and the network calibration modules are connected to the phase shifters, where the one phase shifter integrated with the combiner is connected to the power divider, and at least one output port of the at least one other phase shifter is connected to the phase shifter integrated with the combiner.

With reference to the first implementation, in a second implementation, the phase shifters include a first phase shifter and a second phase shifter, where the first phase shifter is integrated with a first combiner and a second combiner.

With reference to the second implementation, in a third implementation, the first combiner and the second combiner are separately disposed at two ends of the first phase shifter.

With reference to the second or third implementation, in a fourth implementation, the second phase shifter is connected to the first combiner by using a first group of cables, and the second phase shifter is connected to the second combiner by using a second group of cables.

With reference to the second or third implementation, in a fifth implementation, the first phase shifter and the second phase shifter are disposed in a cascade manner.

With reference to the second or third implementation, in a sixth implementation, the power divider is connected to the first phase shifter, and the network calibration modules include a first network calibration module and a second network calibration module, where the first phase shifter is connected to the first network calibration module, the second phase shifter is connected to the second network calibration module, and the first network calibration module and the second network calibration module are connected to the connectors.

With reference to the first implementation, in a seventh implementation, the phase shifters include a third phase shifter and a fourth phase shifter, where the third phase shifter is integrated with a third combiner, and the fourth phase shifter is integrated with a fourth combiner.

With reference to the seventh implementation, in an eighth implementation, the third phase shifter and the fourth phase shifter are disposed in a cascade manner.

With reference to the eighth implementation, in a ninth implementation, the third combiner and the fourth combiner are separately disposed on different sides of the third phase shifter and fourth phase shifter.

With reference to the first, second, third, seventh, eighth, or ninth implementation, in a tenth implementation, a semi-closed cavity is disposed in the phase shifter.

The base station antenna provided by the present invention has an integrated design of phase shifters and combiners, which allows cables in different bands to be shared, reduces a quantity of used cables, is easy to implement in an actual layout and production, facilitates the layout and heat dissipation on the whole, satisfies user requirements, and reduces costs. In addition, the integrated design of phase shifters and combiners has advantages of a simple layout and good electromagnetic compatibility.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other similar solutions according to these accompanying drawings without creative efforts.

DETAILED DESCRIPTION OF ILLUSTRATIVE EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Embodiment 1

The embodiment of the present invention provides a base station antenna, which may be applied to scenarios of a radio communication base station, an active antenna, a vertical or horizontal polarized antenna, and the like.

Figure 1:
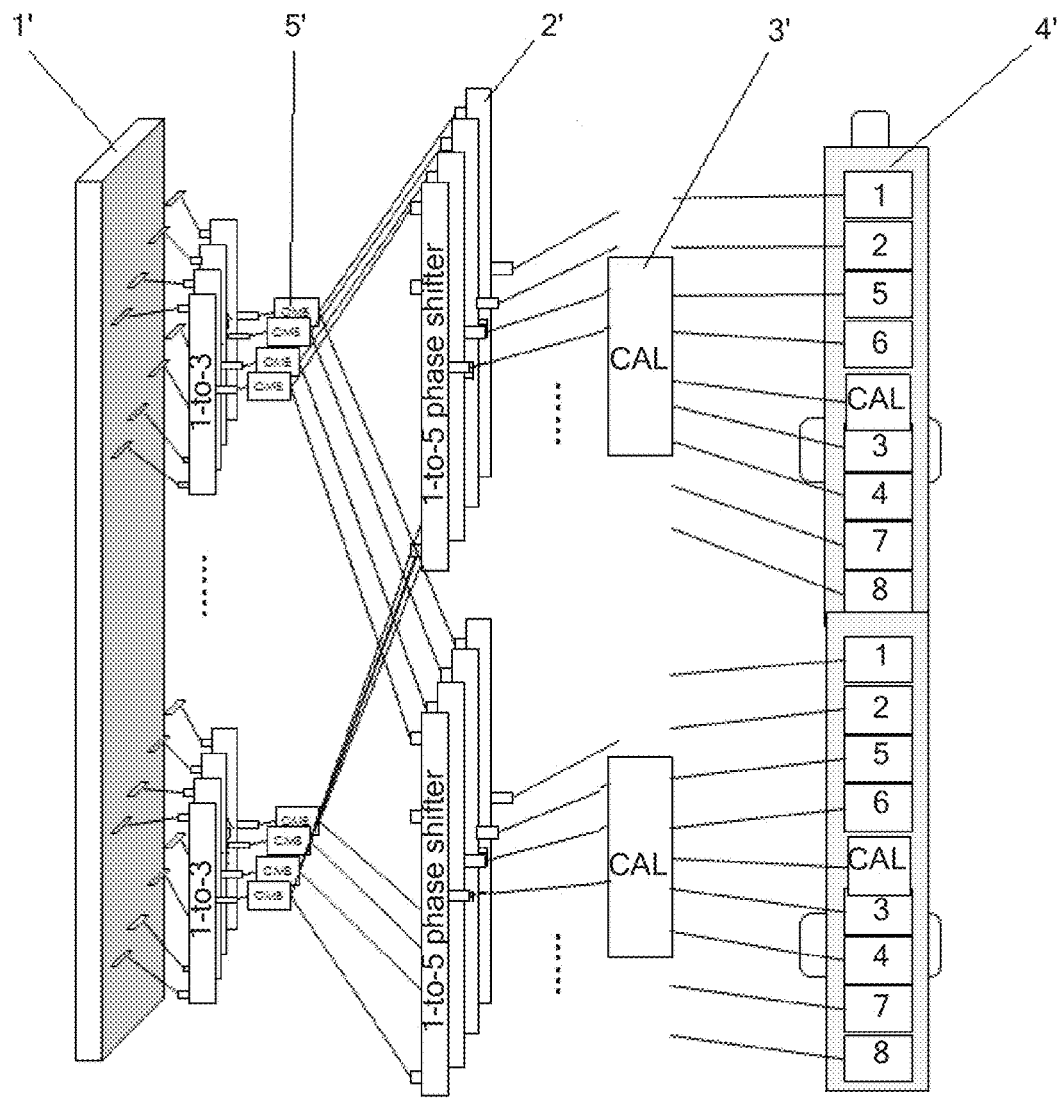
FIG. 1 is a schematic diagram of a planar structure of a base station antenna according to the prior art.
Figure 2:
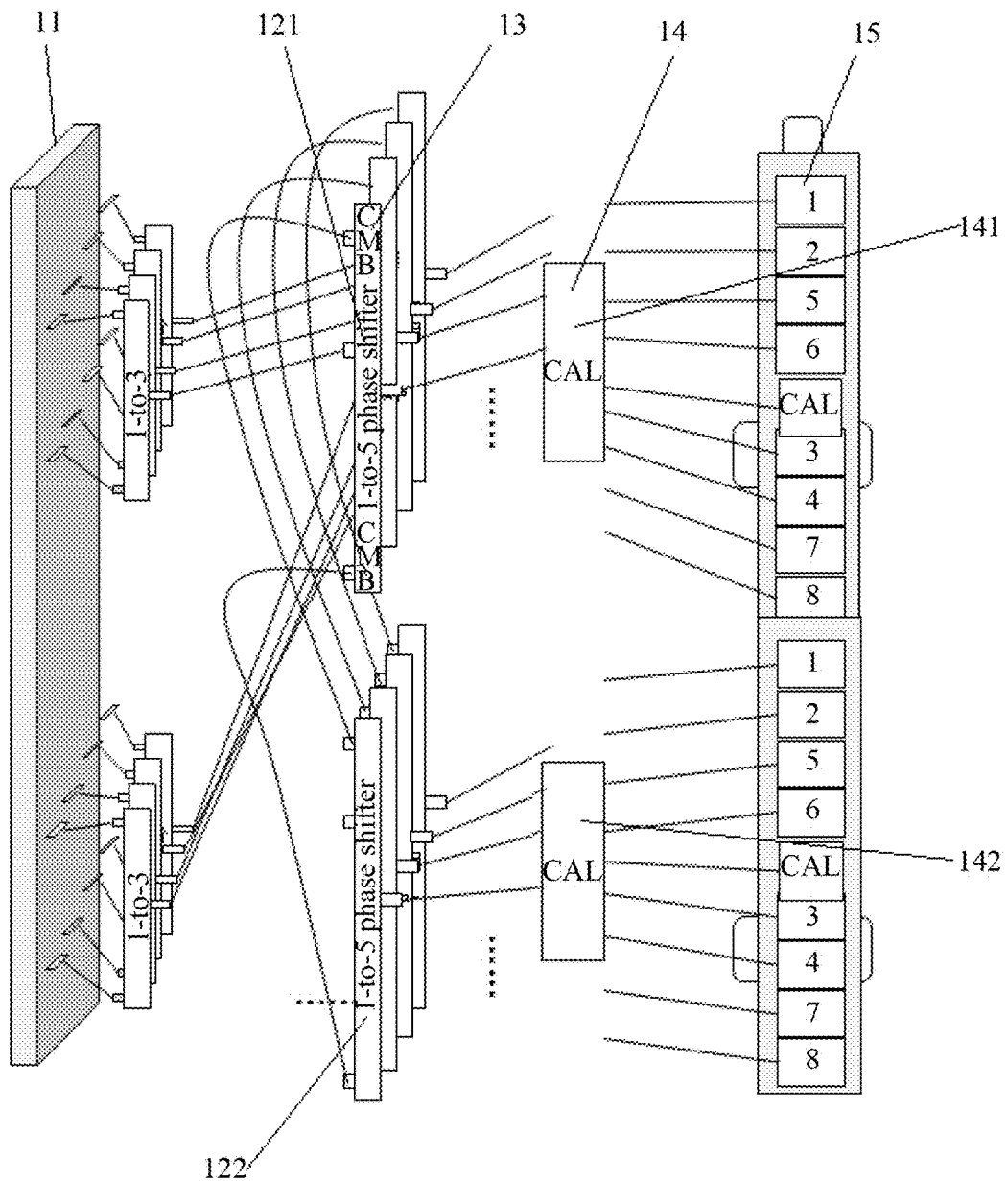
FIG. 2 is a schematic diagram of a planar structure of a base station antenna according to Embodiment 1 of the present invention.

As shown in FIG. 2, the base station antenna includes power dividers 11, network calibration modules 14, and connectors 15. The power divider 11 is a component that may divide an input signal into two or more signals with equal or unequal energy for outputting. A function of the network calibration module 14 is as follows: A smart antenna uses superposition of coherent signals in space to achieve an objective of increasing transmit power and a receive gain; a purpose of calibration is to ensure that signals of all antenna units satisfy a coherence condition at antenna ports, that is, transmit signals at the antenna ports have same power and same phase, and receiving channels satisfy an equal-gain condition; and also to estimate a phase deviation between receiving radio frequency channels. The connectors 15 may be fanout connectors.

As shown in FIG. 2, the base station antenna further includes at least two phase shifters 121 and 122. A phase shifter is an apparatus that can adjust a phase of a wave. At least one phase shifter 121 is integrated with a combiner 13 (Combiner, CMB for short). The phase shifter 122 has at least one output port. The so-called integration refers to an integrated setting, that is, interconnection without using cables, where two circuits are directly connected by using a circuit board or a metallic circuit. The connectors 15 are connected to the network calibration modules 14, and the network calibration modules 14 are connected to the phase shifters. The one phase shifter integrated with the combiner 13 is connected to a power divider 11, and at least one output port of at least one other phase shifter 122 is connected to the phase shifter 121 integrated with the combiner 13. A quantity of phase shifters may be set according to a quantity of bands, and may be two or more. By integrating the combiner 13 into the phase shifter 121, the phase shifters 121 and 122 may be connected by using cables. Even if a quantity of polarizations increases, only one group of cables connected to the two phase shifters is added, and a quantity of cables does not exponentially increase. Cables in different bands are shared, which minimizes a quantity of used cables, reduces costs of the solution, is easy to implement in an actual layout and production, facilitates the layout and heat dissipation on the whole, satisfies user requirements, and reduces costs. In addition, an integrated design of phase shifters and combiners has a simple layout and good EMC (electromagnetic compatibility) design, and is particularly suitable for use in a multi-frequency multi-polarized smart antenna.

Figure 3:
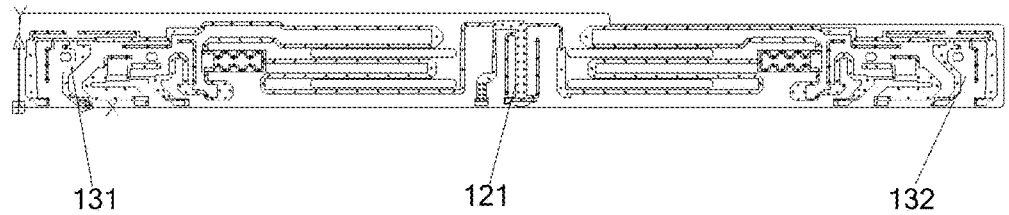
FIG. 3 is a schematic planar diagram of a first phase shifter in a base station antenna according to Embodiment 1 of the present invention.

In this embodiment, as shown in FIG. 2 and FIG. 3, the phase shifters include the first phase shifter 121 and the second phase shifter 122. Certainly, it can be understood that the quantity of phase shifters may be set according to an actual situation such as the quantity of polarizations, may be three or four. The phase shifters may be 1-to-5 phase shifters and the like, and the power dividers 11 may be 1-to-3 power dividers and the like. The first phase shifter 121 is integrated with a first combiner 131 and a second combiner 132. The first combiner 131, the second combiner 132, and the first phase shifter 121 may be integrated into a same circuit board. In this way, the second phase shifter 122 needs to be connected to only the first phase shifter 121 integrated with the first combiner 131 and the second combiner 132, and the second phase shifter 122 does not need to be connected to the power divider 11 and the network calibration module 14, which reduces a quantity of used cables, simplifies a layout, facilitates heat dissipation, reduces costs, and is easy to implement in an actual layout and production.

Specifically, as shown in FIG. 2, the power divider 11 is connected to the first phase shifter 121. The network calibration modules 14 include a first network calibration module 141 and a second network calibration module 142. The first phase shifter 121 is connected to the first network calibration module 141, the second phase shifter 122 is connected to the second network calibration module 142, and the first network calibration module 141 and the second network calibration module 142 are connected to the connectors 15.

As shown in FIG. 2, the connectors 15 are connected to the network calibration modules 14 by using cables, and the network calibration modules 14 are connected to the first phase shifter 121 and the second phase shifter 122 by using cables, where the first phase shifter 121 and second phase shifter 122 share cables reaching a radiating element.

Specifically, as shown in FIG. 2 and FIG. 3, the second phase shifter 122 is connected to the first combiner 131 by using a first group of cables, and the second phase shifter 122 is connected to the second combiner 132 by using a second group of cables. The cables in this embodiment may be cables of an appropriate type, such as radio-frequency cables.

Figure 4:
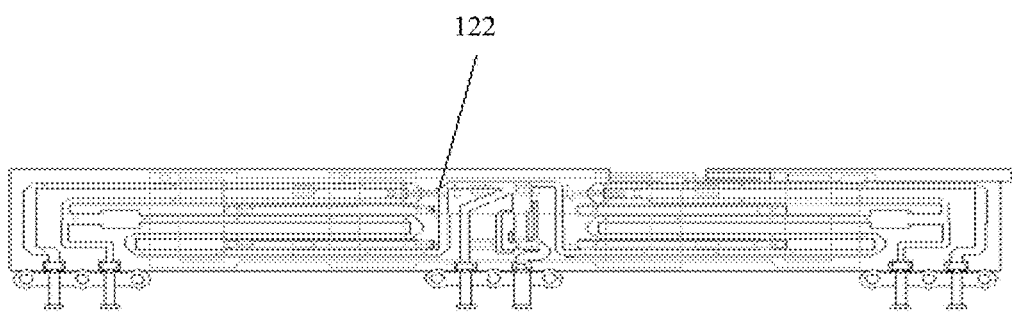
FIG. 4 is a schematic planar diagram of a second phase shifter in a base station antenna according to Embodiment 1 of the present invention.

Specifically, as shown in FIG. 3 and FIG. 4, the first combiner 131 and the second combiner 132 are separately disposed at two ends of the first phase shifter 121, that is, the combiners are separately disposed on two sides of one band phase shifter for facilitate cable connecting. Certainly, it can be understood that the first combiner 131 and second combiner 132 may also be disposed in appropriate positions, such as a middle segment of the circuit board.

Figure 5:
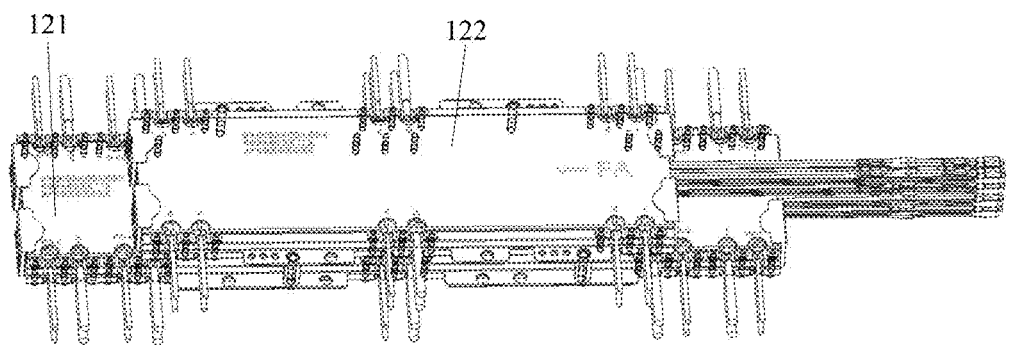
FIG. 5 is a schematic three-dimensional diagram of a first phase shifter and a second phase shifter in a base station antenna according to Embodiment 1 of the present invention.

Specifically, as shown in FIG. 5, the first phase shifter 121 and the second phase shifter 122 are disposed in a cascade manner. The so-called disposing in a cascade manner means that the first phase shifter 121 and the second phase shifter 122 may be cascaded close to each other or cascaded at intervals. The first phase shifter 121 and the second phase shifter 122 may also be cascaded but separated by an appropriate article. In this way, the layout is simplified, and lengths of the cables connected between the first phase shifter 121 and the second phase shifter 122 are as short as possible, which reduces costs and facilitates heat dissipation.

Certainly, the first phase shifter 121 and the second phase shifter 122 may also be disposed in parallel or disposed in other proper arrangement manners.

In this embodiment, a phase shifter implementing band 1 implements only a function of an integrated phase shifter, but a phase shifter implementing band 2 not only implements a function of an integrated phase shifter but also is integrated with a combiner, where passbands of the combiner are: band 1 and band 2. When band 1 is passed, band 2 is blocked; when band 2 is passed, band 1 is blocked. In this way, mutual separation of signals of the two bands (herein referring to band 1 and band 2) is implemented, which satisfies a requirement for transmitting a large signal.

Optionally, in this embodiment, band 1 and band 2 are respectively two important bands in a TD remote electrical tilt antenna, namely, band 1: 1880-2025 MHz, and band 2: 2500-2690 MHz.

Specifically, semi-closed cavities are disposed in the phase shifters 121 and 122. In this embodiment, two semi-closed cavities are placed in a stacking manner to save space. In addition, an end face is grid-shaped. Each hole of the grid shape is corresponding to a polarization. In this way, the multi-frequency multi-polarized phase shift network is smaller. A quantity of semi-closed cavities depends on a quantity of polarizations of the antenna.

The base station antenna provided by the present invention has an integrated design of phase shifters and combiners, where a quantity of combiners placed in the phase shifters may be configured according to a requirement, and phase shifters in different bands may share radio frequency transmission cables from the phase shifters to a radiating element, which reduces a quantity of used cables, is easy to implement in an actual layout and production, facilitates the layout and heat dissipation on the whole, satisfies user requirements, and reduces costs. In addition, the integrated design of phase shifters and combiners has a simple layout and good EMC (Electro Magnetic Compatibility, electromagnetic compatibility) design, and is particularly suitable for use in a multi-frequency multi-polarized smart antenna.

Embodiment 2

Figure 6:
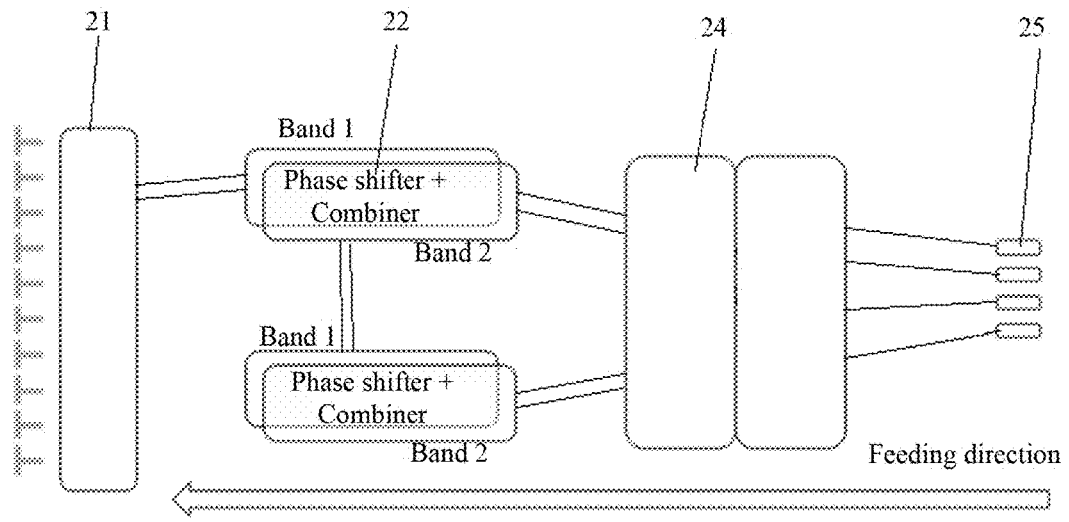
FIG. 6 is a schematic diagram of a planar structure of a base station antenna according to Embodiment 2 of the present invention.

Different from the disposing of the combiners in the base station antenna in Embodiment 1, in this embodiment, as shown in FIG. 6, phase shifters 22 include a third phase shifter 221 and a fourth phase shifter 222, where the phase shifter 221 is integrated with a third combiner 231, and the fourth phase shifter 222 is integrated with a fourth combiner 232. Connectors 25 are connected to network calibration modules 24 by using cables, and the network calibration modules 24 are connected to the third phase shifter 221 and fourth phase shifter 222 by using cables, where the third phase shifter 221 and fourth phase shifter 222 share cables reaching a radiating element.

Certainly, it can be understood that a quantity of phase shifters 22 may also be set to three, four, or the like. The third phase shifter 221 and the fourth phase shifter 222 are connected by using cables.

Specifically, the third phase shifter 221 and the fourth phase shifter 222 are disposed in a cascade manner. The so-called disposing in a cascade manner means that the third phase shifter 221 and the fourth phase shifter 222 may be cascaded close to each other or cascaded at intervals. The third phase shifter 221 and the fourth phase shifter 222 may be also cascaded but separated by an appropriate article. In this way, the layout is simplified, and lengths of the cables connected between the third phase shifter 221 and the fourth phase shifter 222 are shorter, which reduces costs and facilitates heat dissipation.

Figure 7:
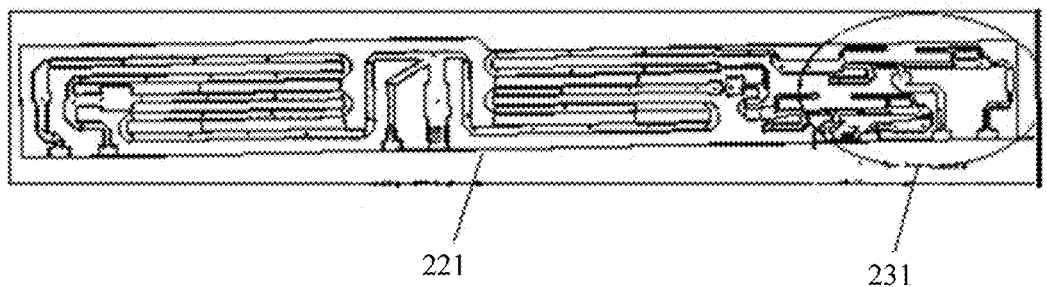
FIG. 7 is a schematic planar diagram of a third phase shifter in a base station antenna according to Embodiment 2 of the present invention.
Figure 8:
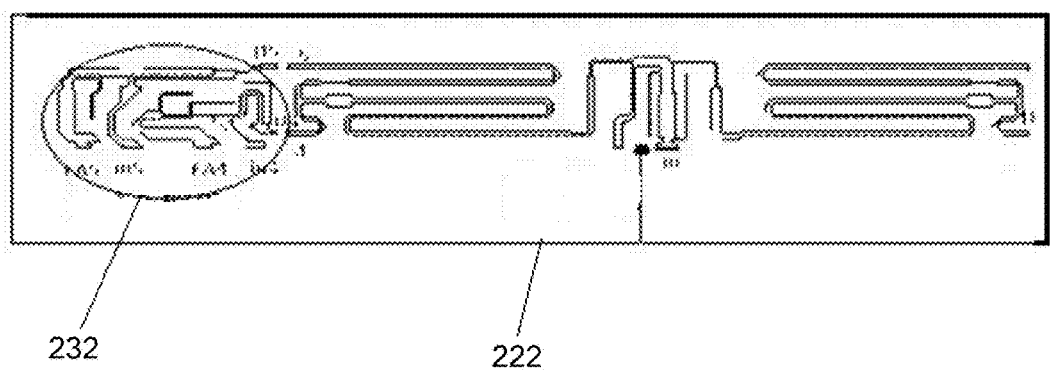
FIG. 8 is a schematic planar diagram of a fourth phase shifter in a base station antenna according to Embodiment 2 of the present invention.

Specifically, as shown in FIG. 7 and FIG. 8, the third combiner 231 and the fourth combiner 232 are separately disposed on different sides of the third phase shifter 221 and the fourth phase shifter 222, that is, the combiners are separately disposed on different sides of two band phase shifters for facilitating cable connecting. In this way, the lengths of the cables connected between the third phase shifter 221 and the fourth phase shifter 222 are further shortened.

In this embodiment, a phase shifter in band 1 is integrated with two pairs of combiners, and a phase shifter in band 2 is integrated with two pairs of combiners, where passbands of the combiners are: band 1 and band 2. When band 1 is passed, band 2 is blocked; when band 2 is passed, band 1 is blocked. In this way, mutual separation of signals of the two bands (herein referring to band 1 and band 2) is implemented, which satisfies a requirement for transmitting a large signal.

Specifically, a semi-closed cavity is disposed in the phase shifter. In this embodiment, two semi-closed cavities are placed in a stacking manner to save space. In addition, an end face is grid-shaped. Each hole of the grid shape is corresponding to a polarization. In this way, the multi-frequency multi-polarized phase shift network is smaller. A quantity of semi-closed cavities depends on a quantity of polarizations of the antenna.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A base station antenna comprising:
a power divider;
network calibration circuits;
a first phase shifter having a first combiner integrated with the first phase shifter, wherein the first combiner is directly connected to the first phase shifter using a cable-free connection, wherein the first phase shifter is connected between a first network calibration circuit of the network calibration circuits and the power divider, wherein the first combiner is connected to the power divider by a first cable; and
a second phase shifter, wherein at least one port of the second phase shifter is directly connected, using a second cable, to the first combiner, wherein the second phase shifter operates on a different band than the first phase shifter, and wherein the second phase shifter and the first phase shifter share the first cable and transmit signals through the first cable to the power divider.

2. The base station antenna according to claim 1, wherein the first phase shifter is integrated with and directly connected to the first combiner and a second combiner.

3. The base station antenna according to claim 2, wherein the first combiner and the second combiner are separately disposed at two ends of the first phase shifter.

4. The base station antenna according to claim 2, wherein the second phase shifter is connected to the first combiner by using a first group of cables, and the second phase shifter is connected to the second combiner by using a second group of cables.

5. The base station antenna according to claim 2, wherein the first phase shifter and the second phase shifter are disposed in a cascade manner.

6. The base station antenna according to claim 2, wherein the power divider is connected to the first phase shifter, and the network calibration circuits comprise the first network calibration circuit and a second network calibration circuit, wherein the first phase shifter is connected to the first network calibration circuit, and the second phase shifter is connected to the second network calibration circuit.

7. The base station antenna according to claim 1, wherein the second phase shifter is integrated with and directly connected to a second combiner.

8. The base station antenna according to claim 7, wherein the first phase shifter and the second phase shifter are disposed in a cascade manner.

9. The base station antenna according to claim 8, wherein the first combiner and the second combiner are separately disposed on different sides of the first phase shifter and second phase shifter.

10. The base station antenna according to claim 1, wherein a semi-closed cavity is disposed in each of the first phase shifter and the second phase shifter.

11. A base station antenna comprising:
a power divider;
a first combiner connected to the power divider by a first cable and configured to combine a plurality of input signals into a combined output signal;
a first phase shifter connected to a first network calibration circuit, wherein the first phase shifter is integrated with the first combiner and is directly connected to the first combiner by a cable-free connection; and
a second phase shifter connected to a second network calibration circuit, wherein a port of the second phase shifter is directly connected to the first combiner using a second cable, wherein the second phase shifter operates on a different band than the first phase shifter, and wherein the second phase shifter and the first phase shifter share the first cable and transmit signals through the first cable to the power divider.

12. The base station antenna according to claim 11, further comprising a second combiner, wherein the first phase shifter is integrated with the first combiner and the second combiner.

13. The base station antenna according to claim 12, wherein the first combiner and the second combiner are separately disposed at two ends of the first phase shifter.

14. The base station antenna according to claim 12, wherein the second phase shifter is connected to the first combiner by using a first group of cables, and the second phase shifter is connected to the second combiner by using a second group of cables.

15. The base station antenna according to claim 12, wherein the first phase shifter and the second phase shifter are disposed in a cascade manner.

16. The base station antenna according to claim 12, wherein the base station antenna further comprises connectors, and
wherein the first network calibration circuit and the second network calibration circuit are connected to the connectors, wherein a signal feed is provided through the connectors to the first network calibration circuit and the second network calibration circuit.

17. The base station antenna according to claim 11, wherein the first phase shifter is integrated with the first combiner, and the second phase shifter is integrated with a second combiner.

18. The base station antenna according to claim 17, wherein the first phase shifter and the second phase shifter are disposed in a cascade manner.

19. The base station antenna according to claim 18, wherein the first combiner and the second combiner are separately disposed on different sides of the first phase shifter and second phase shifter.

20. The base station antenna according to claim 11, wherein a first semi-closed cavity is disposed in the first phase shifter and a second semi-closed cavity is disposed in the second phase shifter.

* * * * *